(12) United States Patent
Michelau et al.

(10) Patent No.: US 6,840,527 B1
(45) Date of Patent: Jan. 11, 2005

(54) TRICYCLE WITH GEARED AUXILIARY STEERING MECHANISM

(75) Inventors: Frederick Michelau, Des Plaines, IL (US); Thomas Schlegel, Wheaton, IL (US)

(73) Assignee: Radio Flyer, Inc., Chicago, IL (US)

( * ) Notice: Subject to any disclaimer, the term of this patent is extended or adjusted under 35 U.S.C. 154(b) by 0 days.

(21) Appl. No.: 10/800,958

(22) Filed: Mar. 15, 2004

(51) Int. Cl.[7] .............................................. B62B 3/12
(52) U.S. Cl. .................. 280/270; 280/282; 280/47.11; 280/304.5
(58) Field of Search .............................. 280/270, 282, 280/293, 47.11, 263, 304.5, 288.4; D12/112

(56) References Cited

U.S. PATENT DOCUMENTS

| | | | | |
|---|---|---|---|---|
| 94,056 A | * | 8/1869 | Allen | 280/267 |
| 638,112 A | * | 11/1899 | Graham | 280/270 |
| 2,816,775 A | | 12/1957 | Costello | |
| 3,485,507 A | * | 12/1969 | Christof | 280/202 |
| D332,591 S | * | 1/1993 | Reely | D12/129 |
| 5,924,713 A | | 7/1999 | Li | |
| 5,954,349 A | * | 9/1999 | Rutzel | 280/87.041 |
| 6,120,048 A | | 9/2000 | Li | |
| 6,302,421 B1 | * | 10/2001 | Lee | 280/210 |
| 6,612,598 B2 | | 9/2003 | Wu | |

* cited by examiner

*Primary Examiner*—Avraham Lerner
(74) *Attorney, Agent, or Firm*—Piper Rudnick LLP

(57) ABSTRACT

A tricycle features a hollow main frame member to which a pair of rear wheels and a seat are mounted. A head tube is attached to the main frame member and a post is pivotally positioned therein. The tricycle front wheel is connected to the lower end of the post while handlebars are connected to the upper end of the post. A steering miter gear is also attached to the post within the head tube. A steering shaft is rotatably positioned with the hollow main frame member and features miter gears on its leading and trailing ends. The miter gear on the leading end engages the steering miter gear while the miter gear on the trailing end engages a miter gear that is removably engaged by a pushing and steering handle. The tricycle thus may be pushed and steered by the handle.

20 Claims, 4 Drawing Sheets

TRICYCLE WITH GEARED AUXILIARY STEERING MECHANISM

BACKGROUND OF THE INVENTION

The present invention relates generally to tricycles for children and, more particularly, to a tricycle for children featuring a geared auxiliary steering mechanism.

Tricycles have long been a popular type of riding vehicle for children. A tricycle features a front wheel that is equipped with pedals and a pair of rear wheels that are spaced apart and joined to the front wheel by a frame. A seat is typically mounted to the frame as is a head tube that receives a post. The front wheel is attached to the bottom of the post via a fork. Handlebars are attached to the top end of the post and the post pivots about its longitudinal axis within the head tube. As a result, the tricycle may be steered by the handlebars.

Tricycles featuring push handles have become popular in the marketplace. The push handles are typically attached to the tricycle frame behind the seat and in front of the rear wheels in a removable fashion and extend up and rearwards for easy gripping by an adult walking behind the tricycle. Such push handles permit the tricycle to be used as a stroller and also allow an adult to assist the child as he or she rides the tricycle. For example, the adult can provide a helpful push when the tricycle is going up a hill.

Providing push handles with auxiliary tricycle steering capability facilitates use of the tricycle as a stroller. In addition, it is often desirable for a parent to be able to assist a child in steering a tricycle as a child is learning to ride the tricycle. Inconvenience at best and back pain and injuries at worst may result if an adult is required to bend over and grasp the handlebars from behind the tricycle. As a result, tricycles with push handles that may be used to steer the tricycle have begun to appear in the marketplace.

One type of auxiliary steering arrangement is illustrated in U.S. Pat. Nos. 5,924,713 and 6,120,048, both to Li. Each of these two patents discloses a tricycle that features a push handle pivotally attached by its lower end to the tricycle frame behind the seat. A link featuring horizontally-extending opposing arms is attached to the lower end of the push handle and pivots with the push handle. A pair of rods run in a parallel fashion down opposite sides of the tricycle frame and join the arms of the push handle pivoting link to a bracket attached to the pivoting front fork of the tricycle. The handlebars of the tricycle are attached to the top of the front fork which holds the front wheel of the tricycle. As a result, when the push handle is pivoted, the front wheel of the tricycle is turned.

A disadvantage of the tricycle of the Li '713 and '048 patents, however, is that the external location of the rods connecting the push handle pivot link to the front fork exposes them to potential damage such as bending. The exposed rods could also rub the legs of a child riding the tricycle. In addition, the arrangement is complex from the standpoint that there are pivot connections between the ends of each rod and the handlebar bracket and push handle pivot link. Each such pivot connection requires hardware such as nuts and bolts and is a point of wear. The nuts and bolts could also come loose and require periodic re-tightening.

Another auxiliary steering arrangement for a tricycle is illustrated in U.S. Pat. No. 6,612,598 to Wu. The Wu '598 patent also illustrates a tricycle with a push handle pivotally attached by its lower end to the frame of the tricycle behind the seat. A circular gear is attached to the bottom of the push handle so as to pivot with the push handle. The teeth of the gear extend in a horizontal plane and radially from the axis of rotation of the gear and the push handle. A similar gear is attached to the front fork of the tricycle which holds the tricycle front wheel and to which the tricycle handlebars are attached. A belt extends between the gear of the front fork and the gear of the push handle and features a toothed inner-surface that engages the gears. As a result, when the push handle is pivoted, the belt is moved via the push handle gear so that the front wheel of the tricycle is moved via the front fork gear.

Although the belt-drive arrangement of the Wu '598 patent may be concealed within a frame cover so as to not be exposed, the belt is subject to wear and could stretch and require replacement. This could be a time-consuming chore and inconvenience. In addition, durability is a concern as the teeth on the inner surface of the belt could break or wear off or the belt could skip teeth on the gears as it stretches and wears.

Accordingly, it is an object of the present invention to provide an auxiliary steering mechanism for a tricycle that may be contained within a frame tube of a tricycle so as to be protected from damage.

It is another object of the present invention to provide an auxiliary steering mechanism for a tricycle that is simple and economical to construct.

It is another object of the present invention to provide an auxiliary steering mechanism for a tricycle that is durable.

It is still another object of the present invention to provide an auxiliary steering mechanism for a tricycle that is easy to maintain.

SUMMARY OF THE INVENTION

The present invention is directed to a tricycle featuring an auxiliary steering mechanism. The tricycle features a hollow main frame member to which a seat and a pair of rear wheels are mounted. A head tube is also attached to the main frame member and a front wheel and handlebars are mounted to a post which is pivotally mounted within the head tube.

A steering shaft is mounted within the frame member by bearings so as to rotate about its longitudinal axis. Mitre gears are mounted on leading and trailing ends of the steering shaft. A steering mitre gear is mounted to the post via a post tube and the post tube is pivotally mounted within the head tube by upper and lower bearings. The steering mitre gear engages the mitre gear mounted on the leading end of the steering shaft. A push handle tube is pivotally mounted within the main frame member by bearings and features a push handle mitre gear that engages the mitre gear on the trailing end of the steering shaft. A pushing and steering handle removably engages the push handle tube so that the tricycle may pushed and steered by the handle.

The following detailed description of embodiments of the invention, taken in conjunction with the accompanying drawings and claims, provide a more complete understanding of the nature and scope of the invention.

DESCRIPTION OF THE PREFERRED EMBODIMENTS

Figure 1:
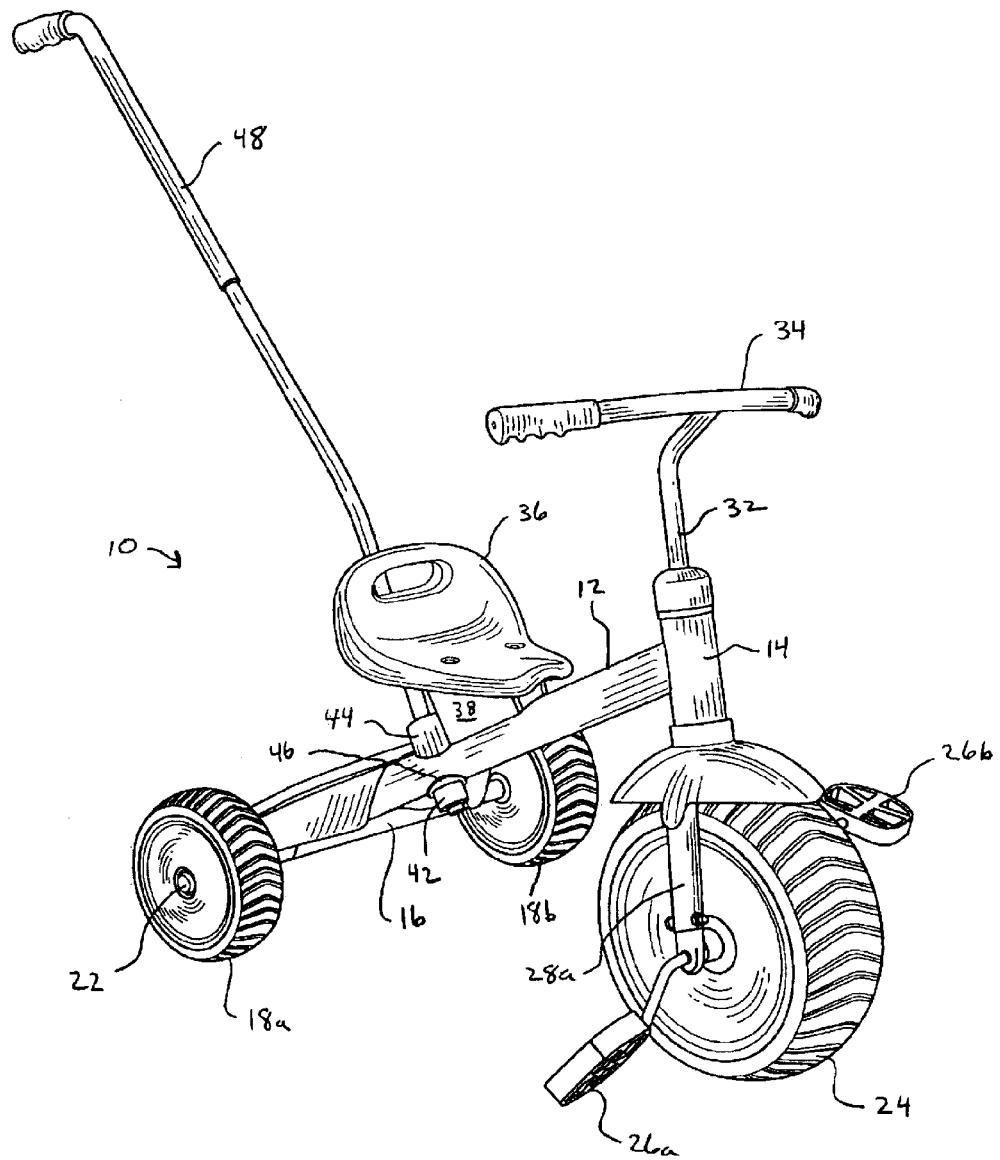
FIG. 1 is a front side perspective view of an embodiment of the tricycle of the present invention with the pushing and steering handle in place.
Figure 2:
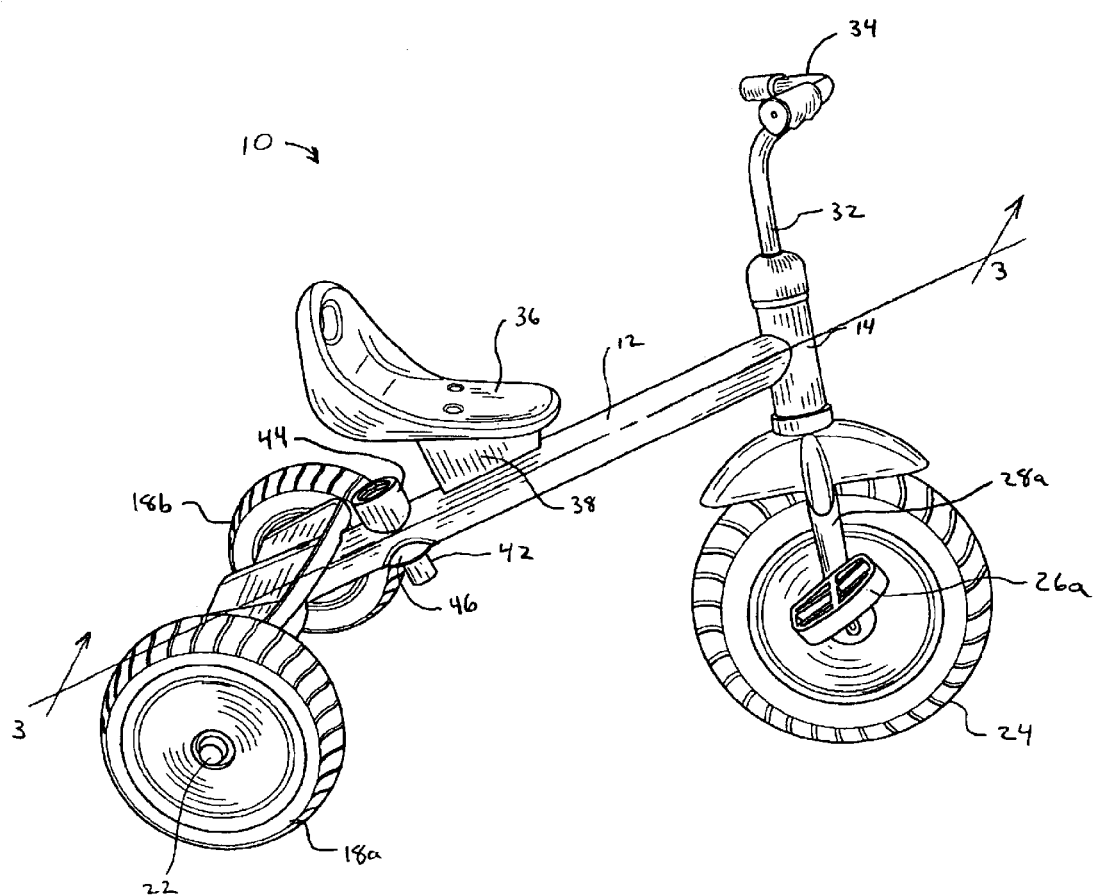
FIG. 2 is a top side perspective view of the tricycle of FIG. 1 with the pushing and steering handle removed.

An embodiment of the tricycle of the present invention is indicated in general at 10 in FIGS. 1 and 2. The tricycle features a hollow main frame member 12. A head tube 14 is attached to the leading end of the frame member 12. An axle tube, illustrated at 16 in FIG. 1, is attached to the trailing end of frame member 12. A pair of rear wheels 18a and 18b are mounted upon an axle 22 that passes through axle tube 16. The tricycle also features a front wheel 24 having pedals 26a and 26b attached thereto. The front wheel is mounted between a pair of front fork members 28a and 28b (28b not visible in FIGS. 1 and 2), which are attached to the bottom end of a post 32. Handlebars 34 are attached to the top end of the post. The post 32 is pivotally mounted within the head tube 14 so that the tricycle may be steered by handlebars 34. A seat 36 is mounted upon the frame member 12 by seat bracket 38. The frame, head tube, rear axle tube, post and front forks are preferably made of steel.

As also illustrated in FIGS. 1 and 2, a push handle tube 42 is positioned through the main frame member 12 and pivotally mounted therein by upper push handle tube bearing 44 and lower push handle tube bearing 46. As will be explained in greater detail below, a pushing and steering handle, illustrated at 48 in FIG. 1, is removably received within push handle tube 42. As a result, the tricycle may be configured as in FIG. 1 for pushing and steering via the handle 48 or alternatively as in FIG. 2 for use by a child without the pushing and steering handle.

Figure 3:
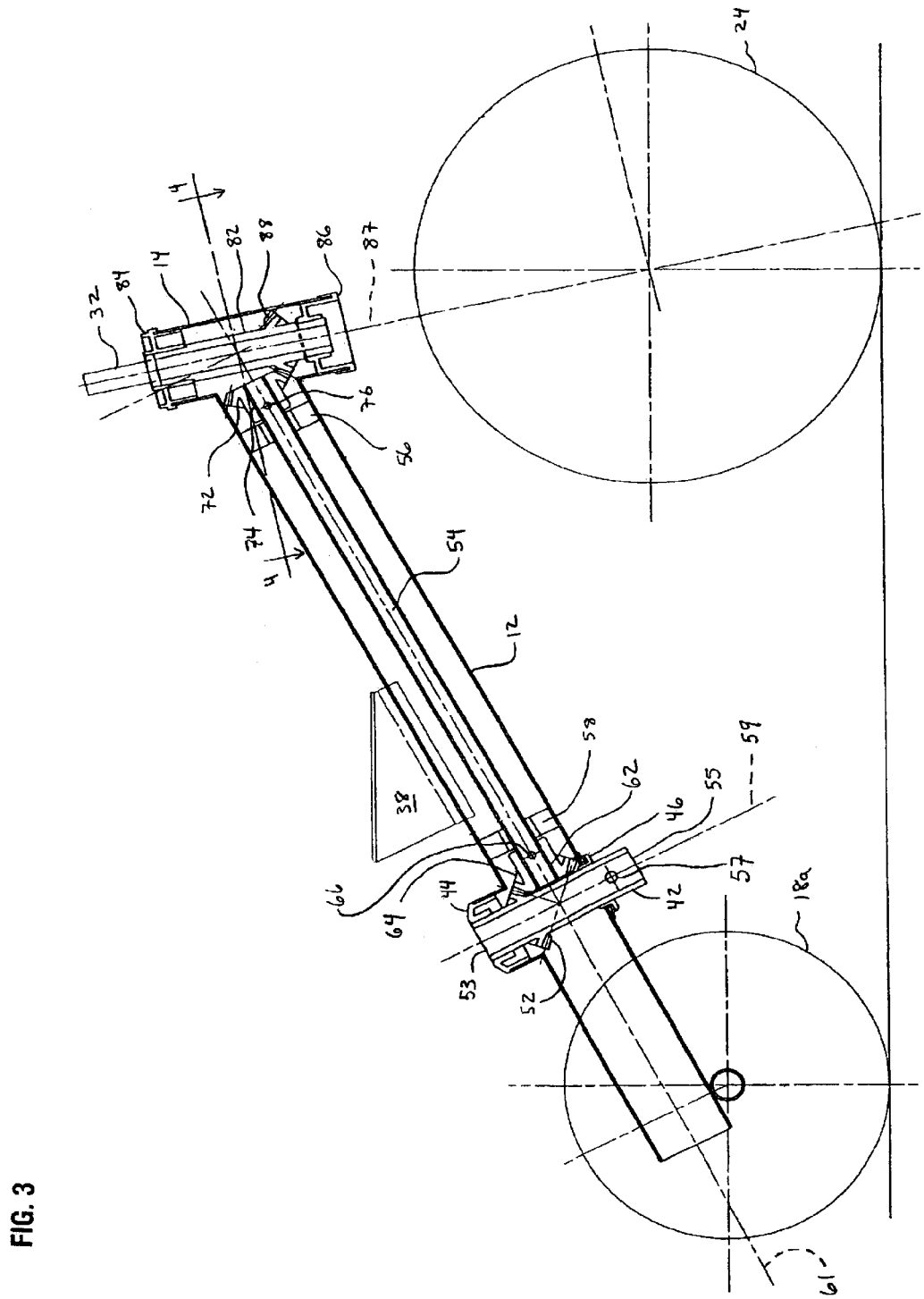
FIG. 3 is a sectional view taken along line 3—3 of FIG. 2.

As illustrated in FIG. 3, the external periphery of the push handle tube 42 is equipped with a push handle mitre gear 52. The upper and lower push handle tube bearings, 44 and 46, respectively, engage upward and downward facing openings formed in the frame 12 of the tricycle. The pushing and steering handle (48 in FIG. 1) is inserted through the upper opening 53 of push handle tube 42 and extends through the push handle tube and out lower opening 55 during installation. The lower end of the pushing and steering handle features spring-loaded push pins that engage opposing apertures 57 formed in the push handle tube when the handle is positioned within the tube. Such spring loaded push pins are well known in the art. The push handle tube 42 and mitre gear 52 turn when the pushing and steering handle is pivoted about axis 59.

As further illustrated in FIG. 3, a steering shaft 54 is mounted within the frame member 12 by leading frame bearing 56 and trailing frame bearing 58 so as to rotate about axis 61. Mounted on the trailing end 62 of steering shaft 54 is a steering shaft trailing end mitre gear 64. The mitre gear 64 is secured to the trailing end 62 of steering shaft 54 by a pin or screw passing through a passage 66 formed through the steering shaft trailing end and the mitre gear 64. Mitre gears 52 and 64 engage one another so that mitre gear 64 and steering shaft 54 turn when push handle tube 42 and mitre gear 52 are turned via pushing and steering handle 48 (FIG. 1).

A steering shaft leading end mitre gear 72 is mounted to the leading end 74 of steering shaft 54 by a screw or pin passing through passage 76 formed through the mitre gear 72 and the steering shaft leading end. A post tube 82 is mounted within the head tube 14 by upper post tube bearing 84 and lower post tube bearing 86 so as to pivot about axis 87. A steering mitre gear 88 is positioned around the external periphery of the post tube 82 and engages mitre gear 72.

Figure 4:
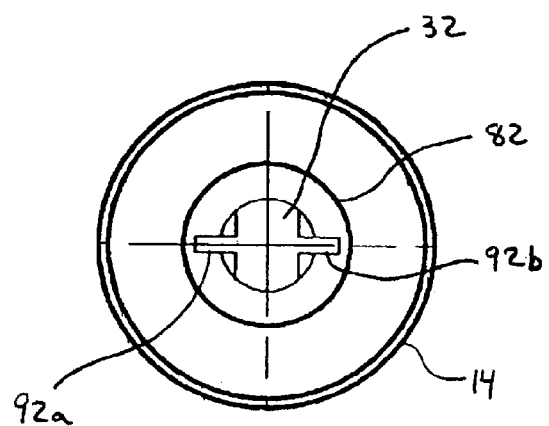
FIG. 4 is an enlarged sectional view taken along line 44 of FIG. 3.

As described previously, handlebars (34 in FIGS. 1 and 2) are attached to the top of post 32 while the front fork members (28a and 28b in FIGS. 1 and 2) holding front wheel 24 are connected to the bottom end of post 32. As illustrated in FIG. 4, the interior surface of post tube 82 is keyed so as to accept projections 92a and 92b formed on the portion of post 32 that is positioned within the head tube 14. As a result, the tricycle fiont wheel and handlebar are turned via post 32 when the post tube 82 is turned.

In summary, when the pushing and steering handle 48 is installed as illustrated in FIG. 1, push handle tube 42 and mitre gear 52 are rotated about axis 59 as the pushing and steering handle is turned. The interaction of mitre gears 52 and 64 cause steering shaft 54 to rotate around axis 61 so that mitre gear 72 is turned. The interaction between mitre gears 72 and 88 cause post tube 82 to turn which causes the tricycle front wheel and handlebars to turn about axis 87. The positioning of mitre gears 52 and 64 and 72 and 88 with respect to one another cause the tricycle front wheel and handlebars to pivot clockwise when the pushing and steering handle is pivoted clockwise, and vice versa.

Push handle tube 42 (including the mitre gear), upper and lower push handle bearings 44 and 46, post tube 82 and upper and lower post tube bearing 84 and 86 may be constructed either from steel or hardened plastic. In addition, it should be noted that while the above embodiment uses mitre gears, bevel gears could be substituted to provide alternative gear ratios for the steering action of the tricycle.

The present invention thus provides a tricycle with an auxiliary steering mechanism that requires very little maintenance and is simple and economical to construct and durable. In addition, the auxiliary steering mechanism of the present invention is enclosed by the tricycle frame to protect against damage. While a tricycle has been described above, it is to be understood that the geared auxiliary steering mechanism of the present invention could alternatively be employed in other types of children's riding vehicles, such as pedal cars or footto-floor toys.

While the preferred embodiments of the invention have been shown and described, it will be apparent to those skilled in the art that changes and modifications may be made therein without departing from the spirit of the invention, the scope of which is defined by the appended claims.

What is claimed ed is:

1. A tricycle with auxiliary steering comprising:
   a. a hollow main frame member;
   b. a pair of rear wheels mounted to the main frame member;
   c. a front wheel pivotally attached to the main frame member;
   d. a steering shaft mounted within the frame member so as to rotate about a longitudinal axis of the steering shaft;
   e. gears mounted on leading and trailing ends of the steering shaft;
   f. a steering gear mounted on the pivoting front wheel, said steering gear engaging the gear mounted on the leading end of the steering shaft;
   g. a push handle gear engaging the gear mounted on the trailing end of the steering shaft; and
   h. a pushing and steering handle pivotally mounted to said main frame member and engaging the push handle gear so that the tricycle may be steered by the pushing and steering handle.

2. The tricycle of claim 1 wherein the gears are mitre gears.

3. The tricycle of claim 1 further comprising a head tube attached to the main frame member and a post to which said front wheel is mounted, said post pivotally mounted within the head tube and said steering gear mounted to the post.

4. The tricycle of claim 1 wherein the steering shaft is mounted within the hollow main frame member by bearings.

5. The tricycle of claim 1 wherein the push handle gear is also mounted within the hollow main frame member.

6. The tricycle of claim 5 wherein the steering and pushing handle is removably mounted to the main frame member and removably engages the push handle gear.

7. The tricycle of claim 1 further comprising a seat mounted to said main frame member and said pushing and steering handle is mounted to the main frame member between the seat and the rear wheels.

8. The tricycle of claim 1 wherein the push handle gear is positioned upon a push handle tube that is rotatably mounted within the main frame member and which removably receives the pushing and steering handle.

9. The tricycle of claim 8 wherein the push handle tube is mounted within the main frame member by upper and lower bearings.

10. The tricycle of claim 1 further comprising a head tube attached to the main frame member and a post to which said front wheel is mounted and wherein the steering gear is positioned upon a post tube that is rotatably mounted within the head tube and the post engages the post tube.

11. The tricycle of claim 10 wherein the post tube is mounted within the head tube by upper and lower bearings.

12. An auxiliary steering mechanism for a children's riding vehicle featuring a hollow frame member with a front wheel pivotally mounted thereto comprising:

a. a steering shaft adapted to be mounted within the hollow frame member so as to rotate about a longitudinal axis of the steering shaft;

b. gears mounted on the leading and trailing ends of the steering shaft;

c. a steering gear adapted to be mounted on the front wheel, said steering gear engaging the gear mounted on the leading end of the steering shaft;

d. a push handle gear adapted to be rotatably mounted to the hollow frame member and engaging the gear mounted on the trailing end of the steering shaft; and e. a steering and pushing handle adapted to be pivotally mounted to the hollow frame member and engaging the push handle gear.

13. The auxiliary steering mechanism of claim 12 wherein the gears are mitre gears.

14. The auxiliary steering mechanism of claim 12 wherein the vehicle is a tricycle.

15. The auxiliary steering mechanism of claim 12 further comprising bearings adapted to mount the steering shaft within the hollow frame member.

16. The auxiliary steering mechanism of claim 12 wherein the push handle gear is also adapted to be mounted within the hollow frame member.

17. The auxiliary steering mechanism of claim 16 wherein the steering and pushing handle is adapted to be removably mounted to the hollow frame member and removably engages the push handle gear.

18. The auxiliary steering mechanism of claim 12 where the vehicle includes a seat mounted to the hollow frame member and said pushing and steering handle is adapted to be mounted to the hollow frame member behind the seat.

19. The auxiliary steering mechanism of claim 12 wherein the push handle gear is positioned upon a push handle tube that is adapted to be rotatably mounted within the hollow frame member and which removably receives the pushing and steering handle.

20. The auxiliary steering mechanism of claim 19 further comprising upper and lower bearing that are adapted to mount the push handle tube within the hollow frame member.

* * * * *